United States Patent
Ligner et al.

(10) Patent No.: US 12,440,820 B2
(45) Date of Patent: Oct. 14, 2025

(54) LIME-BASED SORBENT FOR USE IN A FLUE GAS TREATMENT INSTALLATION AND PROCESS OF MANUFACTURING SAID LIME-BASED SORBENT

(71) Applicant: S.A. Lhoist Recherche et Developpement, Ottignies-Louvain-la-neuve (BE)

(72) Inventors: Emanuelle Ligner, Villerot (BE); Thierry Chopin, Brussels (BE); Marion Lorgouilloux, Strepy Bracquegnies (BE)

(73) Assignee: S.A. Lhoist Recherche et Developpment, Ottignies-Louvain-la-Neuve (BE)

( * ) Notice: Subject to any disclaimer, the term of this patent is extended or adjusted under 35 U.S.C. 154(b) by 847 days.

(21) Appl. No.: 17/760,522

(22) PCT Filed: Sep. 22, 2020

(86) PCT No.: PCT/EP2020/076442
§ 371 (c)(1),
(2) Date: Mar. 15, 2022

(87) PCT Pub. No.: WO2021/058487
PCT Pub. Date: Apr. 1, 2021

(65) Prior Publication Data
US 2022/0347651 A1    Nov. 3, 2022

(30) Foreign Application Priority Data
Sep. 23, 2019    (EP) .................................... 19199016

(51) Int. Cl.
*B01J 20/04*    (2006.01)
*B01J 20/24*    (2006.01)
(Continued)

(52) U.S. Cl.
CPC ............. *B01J 20/041* (2013.01); *B01J 20/24* (2013.01); *B01J 20/267* (2013.01);
(Continued)

(58) Field of Classification Search
CPC ........ B01J 20/041; B01J 20/24; B01J 20/267; B01J 20/28059; B01J 20/3021;
(Continued)

(56) References Cited

U.S. PATENT DOCUMENTS

2016/0279567 A1*  9/2016  Dumont ............. B01J 20/28071
2018/0264403 A1   9/2018  Tate et al.

FOREIGN PATENT DOCUMENTS

DE    3620024 A1    12/1987
EP    0313483 A1    4/1989
(Continued)

OTHER PUBLICATIONS

Snoeck et al., "The effects of superabsorbent polymers on the microstructure of cementitious materials studied by means of sorption experiments" Cement and Concrete Research 77, Jul. 2015, 26-35 (Year: 2015).*

(Continued)

*Primary Examiner* — Cam N. Nguyen
*Assistant Examiner* — Abdul-Rahman Yusuf Waleed Smari
(74) *Attorney, Agent, or Firm* — Whitaker Chalk Swindle & Schwartz PLLC; Charles D. Gunter, Jr.

(57) ABSTRACT

Lime-based sorbent suitable for use in a flue gas treatment process comprising at least 70 wt. % of $Ca(OH)_2$ and at least 0.2 wt. % to at most 10 wt. % of a first additive selected among the group of hydrogels of natural or synthetic origin, in particular superabsorbent polymers (SAPs) or in the group of cellulose ethers or a combination thereof, premix for use in a manufacturing process of said sorbent, process (Continued)

for manufacturing the sorbent and use of said sorbent in a flue gas treatment process.

13 Claims, 2 Drawing Sheets

(51) Int. Cl.
  *B01J 20/26* (2006.01)
  *B01J 20/28* (2006.01)
  *B01J 20/30* (2006.01)
(52) U.S. Cl.
  CPC ..... *B01J 20/28059* (2013.01); *B01J 20/3021* (2013.01); *B01J 20/3085* (2013.01); *B01J 2220/46* (2013.01); *B01J 2220/68* (2013.01)
(58) Field of Classification Search
  CPC ............... B01J 20/3085; B01J 2220/46; B01J 2220/68; B01J 20/262; B01J 20/28004; B01J 20/261; B01J 20/28071; C04B 40/0039; B01D 53/02; B01D 53/685; B01D 53/83; B01D 2251/304; B01D 2251/404; B01D 53/508; B01D 2251/604; B01D 2253/112; B01D 2253/202; B01D 2253/304; B01D 2253/306; B01D 2253/311; B01D 2257/2045; B01D 2257/302; B01D 2258/0283; B01D 2258/0291
  See application file for complete search history.

(56) References Cited

FOREIGN PATENT DOCUMENTS

FR        2687396 A1    8/1993
FR        3029195 A1    6/2016
WO     2018185328 A1   10/2018

OTHER PUBLICATIONS

Ji et al., "Setting Characteristics, Mechanical Properties and Microstructure of Cement Pastes Containing Accelerators Mixed with Superabsorbent Polymers (SAPs): An NMR Study Combined with Additional Methods" Materials 12, Jan. 2019, 1-14 (Year: 2019).*
PCT International Application No. PCT/EP2020/076442, International Search Report and Written Opinion, Nov. 2, 2020, 6 pages.
Sorbacal, "Sorbacal SP Highly porous hydrated lime with strong removal performance," Aug. 29, 2023, www.https://www.sorbacal.com/us_en/our-product-range#!/sp.

* cited by examiner

LIME-BASED SORBENT FOR USE IN A FLUE GAS TREATMENT INSTALLATION AND PROCESS OF MANUFACTURING SAID LIME-BASED SORBENT

TECHNICAL FIELD

In a first aspect, the present invention is related to a sorbent suitable for a use in a flue gas treatment installation. In a second aspect, the present invention is related to a premix for use in a manufacturing process of said sorbent. In a third aspect, the present invention is related to a process for manufacturing a sorbent suitable for a use in flue gas treatment installation. In a fourth aspect, the present invention is related to the use of said sorbent in a flue gas treatment process. In a fifth aspect, the present invention is related to a process for flue gas treatment using said sorbent.

STATE OF THE ART

The combustion flue gases contain substances considered harmful to the environment and flue gases treatment is more and more often performed in order to remove or neutralize those harmful substances and pollutants. Various processes are used for flue gas treatment, including the scrubbing technology. A first type of such technology is the wet scrubber technology using wet scrubber units which work generally via the contact of target compounds or particulate matter with a scrubbing liquid which can be water for dust or solutions or suspensions of reagents for targeting specific compounds. A second type of scrubbing technology includes the dry scrubbing systems and the semi-dry scrubbing systems, also called semi-wet scrubbing systems. Those systems in comparison to the wet scrubber units do not saturate the treated flue gas with moisture. In some cases, no moisture is added, while in other cases only the amount of moisture that can be evaporated in the flue gas without condensing is added. The main use of dry or semi-dry scrubbing devices is related to the capture and removal of acid gases such as sulfur oxides and hydrochloric acid primarily from combustion sources. In the present disclosure, the terms "circulating dry" in the wording "circulating dry scrubber device" or "circulating dry scrubber installation" or "circulating dry scrubber systems" or "circulating dry scrubber unit or circulating dry scrubber facility" refers to either "circulating dry scrubber" or "circulating semi-dry scrubber".

Circulating dry scrubber (CDS) technology was first developed for $SO_2$ removal in coal-fired power plants. Today it is also used in flue gas treatment for industrial furnaces and boilers that use biomass, industrial or municipal waste as fuels. The CDS technology generally carries out a CDS process and involves a CDS unit. The CDS unit can be integrated in a more global CDS facility. The CDS process is based on the recirculation of residues collected from particulate control device, comprising unreacted sorbent, reaction products and optionally fly ash.

A CDS unit generally comprises a reactor for receiving flue gases and sorbents which are generally calcium-based sorbents. The reactor is followed by a particulate control device which filters the solids (also called residues and comprising unreacted sorbent, reaction products and optionally fly ash) from the gas released. These solids are partially recycled into the reactor afterwards through a recycling loop. Some fresh sorbent can be periodically or continuously added to the reactor, before or after. In most cases water is injected into the reactor and/or onto the solids for temperature control, to improve the pollutants removal performances and to reactivate the residues. Some CDS facilities have a CDS unit and may comprise a hydrator (also called slaking unit). They use quicklime CaO that is hydrated prior to entering the CDS unit in a CDS process. Some other CDS facilities do not comprise any hydrator and the fresh sorbent injected is hydrated lime.

In a first way to handle a CDS process, the residues are wetted before reinjection in the reactor. In a second way to handle a CDS process, water is directly injected in the reactor.

Unfortunately, even if the CDS technology is effective in terms of removal of pollutants, limitations exist regarding the amount of water which can be added, while water addition remains a key factor for removal of these pollutants. Indeed, it is known that higher capture levels of acid gases can be achieved by increasing the flue gases moisture, while keeping in mind that going below the dew point may cause corrosion issues especially in the reactor.

In the case wherein the residues are wetted before reinjection in the reactor, the maximum water content relative to the mass of dry recirculated residue observed at commercial scale is 10 weight %, more often between 2 and 7 weight %. Above 10% of water content, sticky behavior and clogging phenomena occur on duct walls both in the recycling loop and in the reactor, bringing operational instability up to a complete stop of the flue gas cleaning unit.

In the case wherein water is directly injected in the reactor, even though water is not carried by the recycled material, clogging phenomena appearing in the reactor are still observed, thereby impacting negatively the flue gases treatment process.

There is a need to provide a sorbent and a flue gas treatment process allowing the operation of a CDS process wherein the water content can be increased without impacting negatively the circulating dry scrubbing process. It is particularly desirable to at least reduce the sticky behavior and the clogging phenomena of the recycled materials on duct walls, in the recycling loop and in the reactor.

The document WO2018185328 of the applicant discloses a sorbent for use in a circulating dry scrubber, which comprises at least 50 wt. % of $Ca(OH)_2$ and between 0.5 wt. % to 8 wt. % of silicon or aluminum or a combination thereof expressed under their elemental form, with respect to the total weight of said sorbent under a dry form, wherein the said sorbent further comprises 1 to 12 wt % of bound water with respect to the total weight of said sorbent under a dry form and wherein between 1 to 40 mol % of the calcium is neither under the form of $Ca(OH)_2$ nor $CaCO_3$ nor CaO. Such sorbent is obtained by a process comprising the steps of:

providing quicklime and water in an hydrator;
  slaking said quicklime in the hydrator via a non-wet route;
  collecting a lime-based sorbent at an exit of the hydrator characterized in that said process comprises a further step of adding at least a first additive comprising:

a compound comprising silicon, preferably selected among the group comprising silicates, silicates of sodium, metasilicates, metasilicates of sodium, kieselguhr, diatomite, diatomaceous earth, precipitated silica, rice husk ash, silica fume, perlites, silicic acid, amorphous silica, calcium silicates or a combination thereof, and/or;
  a compound comprising aluminum preferably selected among the group comprising aluminates, aluminates of sodium, aluminum trihydroxide, boehmite, calcium aluminates or a combination thereof, and/or;

a compound comprising silicon and aluminum preferably selected among the group comprising aluminosilicates, aluminosilicates of sodium, fly ash, blast furnace slag, vermiculite paper ash, or a combination thereof;

before or during said slaking step, at a molar ratio between silicon or aluminum or a combination thereof and the calcium provided to said hydrator equal to or below 0.2 and equal to or above 0.02.

Despite such a sorbent presents good performances in terms of capture of pollutants and in terms of fluidity in CDS facilities, there is a need for alternative sorbent compositions obtainable from different raw materials with improved performances.

SUMMARY OF THE INVENTION

According to a first aspect, the present invention is related to a lime-based sorbent suitable for use in a flue gas treatment process comprising:

at least 70 wt. % of $Ca(OH)_2$, preferably at least 80 wt. % of $Ca(OH)_2$, more preferably at least 90 wt. % of $Ca(OH)_2$, more preferably at least 95 wt. % of $Ca(OH)_2$ with respect to the total weight of said lime-based sorbent under a dry form after drying until constant weight at 150° C., and;

and at least 0.2 wt. % to at most 10 wt. %, preferably at least 1 wt. % to at most 5 wt. %, more preferably at least 1.2 wt. % to at most 2.5 wt. % with respect to the total weight of said lime-based sorbent under a dry form after drying until constant weight at 150° C., of a first additive selected among the group of hydrogels forming materials of natural or synthetic origin, in particular superabsorbent polymers (SAPs) or in the group of cellulose ethers or a combination thereof.

The $Ca(OH)_2$ present in said sorbent can be measured qualitatively and quantitatively by usual techniques known by the skilled in the art. The amount of calcium is measured by XRF, the cristalline structure of the compounds is analyzed by XRD and the determination of the proportion of calcium carbonate and/or calcium oxide if present, and calcium hydroxide is determined by thermogravimetry on a sample dried at 150° C. until constant weight.

The additive present in said sorbent can be measured qualitatively and quantitatively by NMR. The additive in said sorbent can be detected after preparation of a sample dried at 150° C. until constant weight and mixing in a deuterated solvent, or a mixture of deuterated solvents, preferably a mixture of $D_2O$ and $CD_3CN$, by $^1H$ NMR or $^{13}C$ NMR or a combination thereof using a probe HR-MAS (high resolution magic angle spinning) for analysis in semi-liquid state, or measured on a solid sample dried at 150° C. until constant weight by solid $^1H$ NMR. Quantitative measurements by NMR can be done by comparison with calibration curves obtained by preparation of samples of sorbent comprising the additive in various concentrations.

The terms "hydrogels forming material" according to the present invention encompass either dehydrated hydrogel (i.e. as a powdery form) or hydrogel having captured water. Also encompassed within the scope of this wording are included any intermediate form such as for example hydrogels forming materials which are in powdery form while having captured ambient humidity, for example including 5% of water or 10% water, but still as powder.

Preferably, the said first additive is selected among:

the group of hydrogels forming materials of synthetic origin including polyacrylates, polyacrylic acids, crosslinked polyacrylates and polyacrylic acids, or crosslinked acrylamide and acrylate copolymers, in particular those partially neutralized with sodium and/or potassium, or the group of hydrogels forming materials of natural origin including guar gum, alginates, dextran or xanthane gum or a combination thereof and/or;

the group of cellulose ethers, including hydroxyalkyl or carboxyalkyl cellulose ethers, in particular carboxymethyl cellulose or hydroxyethyl methyl cellulose (HEMC).

Preferably, the superabsorbent polymer is selected among one or more of the superabsorbent polymer of synthetic origin selected among crosslinked polymers of acrylic or methacrylic acid, crosslinked graft copolymers of the polysaccharide/acrylic or methacrylic acid, crosslinked terpolymers of acrylic acid or methacrylic acid/acrylamide/sulfonated acrylamide and their alkaline earth or alkaline metal salts.

Preferably, the monomers selected for the preparation of the superabsorant polymers are chosen among acrylamide, acrylic acid, ATBS (acrylamido tertio butylsulfonate), NVP (N vinylpyrrolidone), acryloylmorpholine, and/or itaconic acid, each of those monomers being partially or totally salified.

Preferably, the superabsorbant polymers are homopolymers or cross-linked copolymers of acrylic acid partially or totally salified. Superabsorbant polymers can be made of hydrophilic monomers such as cationic polymers including diallyldialkyl ammonium, diallylaminoalkyl (meth)acrylate, dialkylaminoalkyl (meth)acrylamide, their ammonium quaternary salts or their acids, more particularly acrylate of dimethylaminoethyl (ADAME), metacrylate of dimethylaminoethyl (MADAME), acrylamidopropyltrimethylammonium chloride (APTAC) and/or methacrylamidopropyltrimethylammonium chloride (MAPTAC).

Synthetic superabsorbent polymers are generally crosslinked with a cross linking agent selected among N,N-methylene bis acrylamide (MBA), ethylene glycol dimethacrylate, 1,1,1-trimethylolpropane triacrylate, tetreaalluloxy ethane, tetra allylammonium chloride, divinyl benzene, metallic salts or any cross linking agent known in the art.

Superabsorbent polymers are well known polymers available commercially.

According to the present invention, the hydrogels forming material has a water adsorption capacity less than 400 g/g, preferably equal to or less than 350 g/g, more preferably equal to or less than 300 g/g, in particular, equal to or less than 250 g/g and more particularly equal to or lower than 200 g/g expressed as the weight of deionized water with respect to the weight of polymer.

More particularly, according to the present invention, the hydrogels forming material has a water adsorption capacity equal to or higher than 80 g/g, preferably equal to or higher than 100 g/g expressed as the weight of deionized water with respect to the weight of polymer.

Advantageously, the hydrogels forming material has a water adsorption capacity comprised between 100 g/g and 200 g/g, more preferably between 120 g/g and 180 g/g, such as for example around 150 g/g expressed as the weight of deionized water with respect to the weight of polymer.

The first additive according to the present invention, chosen amongst hydrogels forming materials is able to capture water at relatively low temperature such as around ambient temperature for its conditioning but also allows to release water in the CDS unit or the dry scrubber injection (DSI unit, under the form of vapor at an operating temperature comprised between 50° C. and 350° C. and preferably of about 150° C. to 180° C., also in presence of Ca(OH)$_2$. Further the lime-based sorbent combining the hydrogels forming material and Ca(OH)$_2$ remains preferably in powder form to be injected during the flue gas treatment.

The lime-based sorbent according to the present invention sustains numerous passing cycles through the CDS facility in a flue gas treatment during which it alternates between a water capture step (in a conditioning drum for example) and a water release step (in the CDS unit).

In an embodiment, the lime-based sorbent according to the present invention further comprises sodium at an amount of sodium expressed under its equivalent Na$_2$O oxide form in said lime-based sorbent measured by XRF of at least 0.1 weight %, preferably at least 0.3 weight %, preferably at least 0.5 weight %, preferably at least 0.7 weight %, preferably at most 15 weight %, preferably at most 7 weight %, preferably at most 5 weight %, preferably at most 2.5 weight % with respect to the total weight of said sorbent under a dry form.

Preferably, the lime-based sorbent according to the present invention has a BET specific surface area of at least 3 m$^2$/g, preferably at least 10 m$^2$/g, more preferably at least 20 m$^2$/g, preferably at least 40 m$^2$/g measured by manometry with adsorption of nitrogen after degassing in vacuum at 190° C. for at least 2 hours and calculated according the multipoint BET method as described in the ISO 9277/2010E standard. In an embodiment of the invention, the sorbent has a BET specific surface area comprised between 3 and 20 m$^2$/g.

Advantageously, the lime-based sorbent according to the present invention, has a total BJH pore volume of at least 0.01 cm$^3$/g, preferably at least 0.05 cm$^3$/g, more preferably at least 0.1 cm$^3$/g, more preferably of at least 0.15 cm$^3$/g, more preferably at least 0.2 cm$^3$/g, determined manometry with adsorption of nitrogen after degassing in vacuum at 190° C. for at least 2 hours and calculated according the multipoint BJH method as described in the ISO 9277/2010E standard. In an embodiment of the invention, the sorbent has a BJH pore volume comprised between 0.01 and 0.15 cm$^3$/g.

The particle size of the lime-based sorbent, of the hydrated lime and of the additive can be measured by two methods in function of the properties of the samples. A first method is the sieve analysis wherein dry samples are passed through a series of sieves having a mesh size progressively decreasing in size, the retained fraction on each mesh being weighted. A first value $d_{max}$ is defined as the mesh size for which the retained fraction of a powder is inferior to 2% in weight of the powder, and a second value $d_{min}$ is defined as the mesh size for which the retained fraction of the powder is superior to 90% in weight of the powder. This method is used for samples having a $d_{min}$ superior to 30 µm because of the limitation of the mesh size of the sieves. For the sieves having a mesh size inferior to 100 µm, a depression can be applied to force the passage of the particles through the sieves.

A second method for measuring the particle size distribution of the lime-based sorbent, of the hydrated lime and of the additive is the laser granulometry after sonication in a solvent such as for example methanol, wherein the sample is not soluble or does not jellify. A first value $d_{max}$ is defined and corresponds to the $d_{98}$, and a second value $d_{min}$ is defined and corresponds to the $d_{10}$. The notation dx means a particle size distribution of a sample of particles wherein x % of the particles have a size under a certain value expressed in µm.

Preferably the lime-based sorbent according to the present invention has a $d_{max}$ inferior or equal to 1 mm, preferably inferior or equal to 400 µm, more preferably inferior or equal to 200 µm, more preferably inferior or equal to 100 µm, preferably inferior or equal to 80 µm, preferably inferior or equal to 40 µm, more preferably inferior or equal to 30 µm. The $d_{min}$ is preferably superior or equal to 1 µm, preferably superior or equal to 2 µm, more preferably superior or equal to 5 µm, more preferably superior or equal to 10 µm more preferably superior or equal to 20 µm, more preferably superior or equal to 30 µm.

In a preferred embodiment of the lime-based sorbent according to the invention, the said Ca(OH)$_2$ and said first additive are under the form of a blend of powders comprising:
powdered particles of slaked lime having a particle size distribution comprised in a first range of values $d_{max}$ and $d_{min}$, and;
powdered particles of said first additive having a particle size distribution comprised in a second range of values $d_{max}$ and $d_{min}$ overlapping or being equal to the said first range.

It is of great importance than the particle size distribution of the powdered particles of hydrated lime and the powdered particles of additives are close to each other, in order to prevent segregation of the particles of hydrated lime from particles of additive.

According to a second aspect, the present invention is related to a premix for use in a process of manufacturing of a lime-based sorbent, the premix comprising:
at least 70 wt. %, more preferably at least 90 wt. % of quicklime with respect to the total weight of said premix under a dry form after drying until constant weight at 150° C., and;
at least 0.2 wt. % to at most 10 wt. %, preferably at least 1 wt. % to at most 5 wt. %, more preferably at least 1.2 wt. % to at most 2.5 wt. %, of a first additive selected among the group of hydrogels forming materials of natural or synthetic origin, in particular superabsorbent polymers (SAPs) or in the group of cellulose ethers or a combination thereof, with respect to the total weight of said premix under a dry form after drying until constant weight at 150° C.

Providing such a premix can be more advantageous in term of logistics and costs for flue gas treatment plants having a hydrator at their disposal.

Preferably, in the premix according to the invention, the said powdered quicklime and said powdered first additive are under the form of a blend of powders comprising:
powdered particles of quicklime having a particle size distribution comprised in a third range of values $d_{max}$ and $d_{min}$, and;
powdered particles of said first additive having a particle size distribution comprised in a fourth range of values $d_{max}$ and $d_{min}$ overlapping or being equal to the said third range.

It is important that the particle size distributions of the particles of quicklime and of the particles of the first additive are closed to each other, in order to prevent segregation of particles in the premix.

According to a third aspect, the present invention is related to a process for manufacturing a lime-based sorbent suitable for a use in a flue gas treatment process, the process of manufacturing comprising the steps of:
slaking quicklime with water in a hydrator via a non-wet route;
collecting a slaked lime at an exit of the hydrator;
characterized in that said process comprises a further step of adding at least a first additive selected among the group of hydrogels forming materials of natural or synthetic origin, in particular superabsorbent polymers (SAPs) or in the group of cellulose ethers or a combination thereof, said first additive being added before, during or after said step of slaking, at a weight ratio relative to the weight of said slaked lime comprised between 0.2 and 10%, preferably at most 5 wt. %, more preferably at most 2.5 wt. %, wherein the amount of said slaked lime is expressed under equivalent CaO and the amount of said first additive is expressed under dry equivalent form after drying until constant weight at 150° C.

Preferably, in the process of manufacturing according to the invention, the said first additive is selected among:
- the group of hydrogels forming materials of synthetic origin includes crosslinked polyacrylates or crosslinked acrylamide and acrylate copolymers, in particular those partially neutralized with sodium and/or potassium,
- the group of hydrogels forming materials of natural origin includes guar gum, alginates, dextran or xanthane gum or a combination thereof or
- the group of cellulose ethers, includes hydroxyalkyl or carboxyalkyl cellulose ethers, in particular carboxymethyl cellulose or hydroxyethyl methyl cellulose (HEMC).

By the term "hydrator" in the meaning of the present invention, it is meant a conventional hydrator single or multi-stage or a mixer.

According to the invention, the term "slaking via a non-wet route" refers to slaking quicklime with:

In the process of manufacturing according to the invention, the step of slaking is a slaking mode via a "non-wet route" which designates slaking modes via a dry route, via a quasi-dry route or via semi-dry route. In a non-wet route, the amount of water relative to the amount of quicklime is comprised between 0.6 and 1.2. The expression "non-wet route" excludes the two slaking modes via a wet route and via a putty route. Each of these slaking routes is defined herein after.

In a dry hydration of quicklime, meaning a slaking mode "via a dry route", the mass ratio of water to quicklime used for slaking quicklime via a dry route is comprised between 0.6 and 0.7.

In a quasi-dry hydration of quicklime, being another slaking mode, the hydration may be achieved with a larger excess of water, the mass ratio of water to quicklime used for quasi-dry hydration of quicklime is comprised between 0.85 and 1.2.

In a semi-dry hydration of quicklime, the mass ratio of water to quicklime used for slaking quicklime is comprised between 0.7 and 0.85.

In a slaking mode «by a wet route», the amount of added water is in very large excess as compared with the amount strictly required for the slaking reaction, the mass ratio of water to quicklime used for slaking quicklime is typically more than 1.5. A milk of lime is then obtained, i.e. an aqueous suspension of slaked lime particles.

In a slaking mode "via a putty route", the amount of water used for the slaking reaction is a little lower than the amount of water used for the slaking "by the wet route", the mass ratio of water to quicklime used for slaking quicklime is typically more than 1.2 and less than 1.5 and the obtained product is pasty (lime putty).

In the process of manufacturing according to the invention, said first additive is provided at least partially in a solution or in a suspension and added to said water and/or to the slaked lime, and/or said first additive is provided at least partially under solid form and added to said quicklime and/or to the slaked lime.

Preferably, the process of manufacturing according to the invention comprises a step of mixing powdered slaked lime with said first additive under the form of a powder.

In an embodiment of the process of manufacturing a lime-based sorbent according to the invention, the process of manufacturing comprises the steps of:
- slaking quicklime with water in a hydrator via a non-wet route;
- collecting a slaked lime at an exit of a hydrator;
- optionally drying the said slaked lime;
- optionally grinding the said slaked lime;
- optionally air classifying and/or sieving said slaked lime to obtain a slaked lime having a particle size distribution comprised in a first range of particle size defined by a $d_{max}$ and a $d_{min}$;
- providing said first additive having a particles size distribution comprised in a second range of particle size defined by a $d_{max}$ and a $d_{min}$, overlapping or comprised in the range of the said first range of particle size and mixing the said first additive with the said slaked lime having a particle size distribution comprised in a first range of particle size defined by a $d_{max}$ and a $d_{min}$.

Preferably, said first additive is provided with a particle size distribution having a $d_{max}$ inferior or equal to 400 μm and a $d_{min}$ of at least 1 μm, and said powdered slaked lime is air classified or sieved such that to have a particle size distribution within a range comprised between 1 μm and 200 μm, alternatively between 1 and 20 μm, alternatively between 5 and 20 μm, alternatively between 20 and 35 μm, alternatively between 20 and 50 μm, alternatively between 50 and 100 μm, alternatively between 50 and 150 μm, alternatively between 100 and 200 μm.

In one embodiment of the invention, the process of manufacturing comprises a preliminary step of granulometric cutting of particles of hydrated lime and a separated granulometric cutting of particles of additives to remove a fraction of particles inferior to a predetermined value and superior to a predetermined value, such as to provide particles of hydrated lime and particles of additive having similar particle size distribution in order to prevent segregation of particles of hydrated lime from particles of additive. The step of granulometric cutting can be performed by passing the particles of hydrated lime and/or additives through a series of sieves of predetermined mesh sizes or by passing the particles of hydrated lime and/or additives through an air classifier.

In one embodiment, the additive and/or the hydrated lime are ground before the steps of granulometric cutting or inversely.

In another embodiment of the process of manufacturing according to the invention, the process comprises the steps of:
- providing quicklime with a predetermined particle size distribution comprised in a third range of particle size defined by a $d_{max}$ and a $d_{min}$;
- providing said first additive with a particle size distribution comprised between a fourth range of particle size defined by a $d_{max}$ and a $d_{min}$, overlapping or comprised in the range of the said third range of particle size and mixing the said first additive with the said quicklime having a particle size distribution comprised in a third range of particle size defined by a $d_{max}$ and a $d_{min}$ to form a premix;

slaking the said premix via a non-wet route in a hydrator to obtain slaked lime containing said first additive;
collecting slaked lime at an exit of the said hydrator
optionally drying the said slaked lime;
optionally grinding the said slaked lime;
optionally sieving or air classifying said slaked lime.

In an embodiment of the process of manufacturing according to the invention, the process further comprises a step of addition of an amount of a second additive being a salt or hydroxide of an alkali metal before and/or during and/or after said step of slaking, the amount of a salt or hydroxide of an alkali metal being sufficient for obtaining in said sorbent, a content of an alkali metal expressed in oxide equivalent of this alkali metal equal to or greater than 0.2% and equal to or less than 3.5% by weight on the basis of the total weight of the slaked lime.

Preferably, the said salt or hydroxide of alkali metal is soluble in water, such as for example sodium hydroxide, sodium carbonate, sodium hydrogenocarbonate, sodium nitrate, sodium phosphate, sodium persulfate or sodium acetate. Preferably, the alkali compound has a solubility in water at 20° C. superior or equal to 50 g/dm$^3$, preferably superior or equal to 100 g/dm$^3$, preferably superior or equal to 200 g/dm$^3$, preferably superior or equal to 300 g/dm$^3$, preferably superior or equal to 500 g/dm$^3$.

In an embodiment of the process of manufacturing according to the invention, the said salt or hydroxide of alkali metal is provided in under solid form or in a solution and added to the said water and/or to the said quicklime and/or to the said slaked lime. The said salt or hydroxide of alkali metal may be added in the process before and/or during and/or after the step of slaking.

In an embodiment of the process of manufacturing according to the invention, a step of drying said lime-based sorbent and/or granulometric cutting of said lime-based sorbent and/or grinding or milling said lime-based sorbent is performed.

Advantageously, in the process according to the present invention, the residence time of quicklime being slaked inside the hydrator is comprised between 5 and 45 minutes, preferably between 20 and 40 minutes and more preferably between 25 and 35 minutes.

In another embodiment of the process according to the invention, the said quicklime is submitted to a granulometric cutting such that to have particles comprised between a third range of values and the said first additive is submitted to a granulometric cutting such as to have particles comprised between a fourth range of values, and wherein the said third range of values and the said fourth range of values have an overlap. Then a step of blending the said quicklime and the said first additive is provided before the said step of slaking.

According to a fourth aspect, the present invention is related to the use of a lime-based sorbent such as disclosed herein and/or obtained from a manufacturing process as presented herein, in a flue gas treatment process.

According to a fifth aspect, the present invention is related to a flue gas treatment process wherein gas containing pollutants are circulated through a duct before reaching a particulate control device, characterized in that it comprises a step of injection of a lime-based sorbent as presented herein.

The flue gas treatment can be a circulating dry scrubber process or a dry sorbent injection (DSI) process.

The use of a sorbent according to the invention in a circulating dry scrubber process allows to provide a residue which is able to carry more water than prior art residues while keeping a good flowability of such residue in the CDS process, thereby preventing sticking in pipes, ducts or other parts of the circulating dry scrubber unit or facility.

The sorbent according to the present invention provides a residue in a CDS process that presents good flowability properties, even with high moistures such as more than 10 weight % in the residue circulating in a circulating dry scrubber unit or facility.

With higher water content in the sorbent carrying water, the performance of the flue gas treatment device is thought to be improved significantly because:
- adding water is believed helping conditioning the gas reducing in particular the reaction temperature and increasing relative humidity;
- the added water is believed helping rejuvenating the residues bringing remaining $Ca(OH)_2$ available for reaction again;
- the added water is believed creating local favorable conditions around the solid in the reactor to boost the activity of the sorbent, the reaction products (the added water may help converting carbonated forms of Ca into reacted species with targeted acid gas removal ($SO_x$, HCl, HF . . . ) and even possibly the fly ash.

If the same quantity of water can be brought in the reactor on a lower quantity of recycled materials, downsizing the conditioning mixer and all related equipment in particular the conveying devices (screws, airslides . . . ) could be possible at the benefit of investment costs but also utilities and maintenances costs to run a CDS process, which will be reduced as less material would circulate.

In the process of flue gas treatment using a circulating dry scrubber unit or facility, the sorbent particles will enter in contact with flue gas and form a suspension of reacted sorbent particles, unreacted sorbent particles and eventually other by-products. The suspension is filtered by a particulate control device. The flue gas depleted in pollutants is directed to the chimney or stack whereas residues formed by reacted sorbent particles, unreacted sorbent particles and eventually other by-products are redirected and recycled in the CDS unit for another cycle. The said residues can be recirculated and recycled several times. Some fresh sorbent can also be introduced at any time in the CDS facility. Water is added to reactivate the reacted sorbent.

With the sorbent according to the present invention, it is foreseen to add water on said residues circulating in the circulating dry scrubber (CDS) unit or facility such as to have a water content relative to the dry mass of residues of at least 5 weight %, preferably at least 7 weight %, preferably at least 10 weight %, preferably at least 12 weight %, preferably at least 15 weight %.

In function of the ratio of sulfur oxide to HCl in the flue gas treated in a circulating dry scrubber unit or facility, the amount of water added on the residues circulating in the circulating dry scrubber unit or facility can be adapted.

For ratios of sulfur oxide relative to HCl superior to 20, the amount of HCl is generally low and it is possible to add water on the residues circulating in the circulating dry scrubber unit or facility such as to have a water content relative to the dry mass which can go up to maximum 20 weight % without risk of clogging of residues in the circulating dry scrubber unit or facility.

For ratios of sulfur dioxide relative to HCl inferior to 20, the amount of HCl is generally considered as high and may cause more problem of clogging of the residues in the circulating dry scrubber unit or facility. Therefore for such ratios of sulfur oxide to HCl inferior to 20, the water on the residues circulating in the circulating dry scrubber unit or facility can be such as the water content relative to the dry mass of residues is only of at least 2 weight %.

In an embodiment, the process of flue gas treatment according to the invention comprises a step of introduction in the said circulating dry scrubber unit or facility of a sorbent according to the present invention or obtained from a process of manufacturing such as disclosed herein.

One of the advantages of using the lime-based sorbent according to the invention in a dry sorbent injection process, is that the additive can capture the moisture and thereby minimize sticking of the sorbent into the storage silo or into the injection pipe connected to the flow gas duct.

Other characteristics and advantages of the present invention will be derived from the non-limitative following description, and by making reference to the drawings and the examples.

DESCRIPTION OF THE INVENTION

Figure 1:
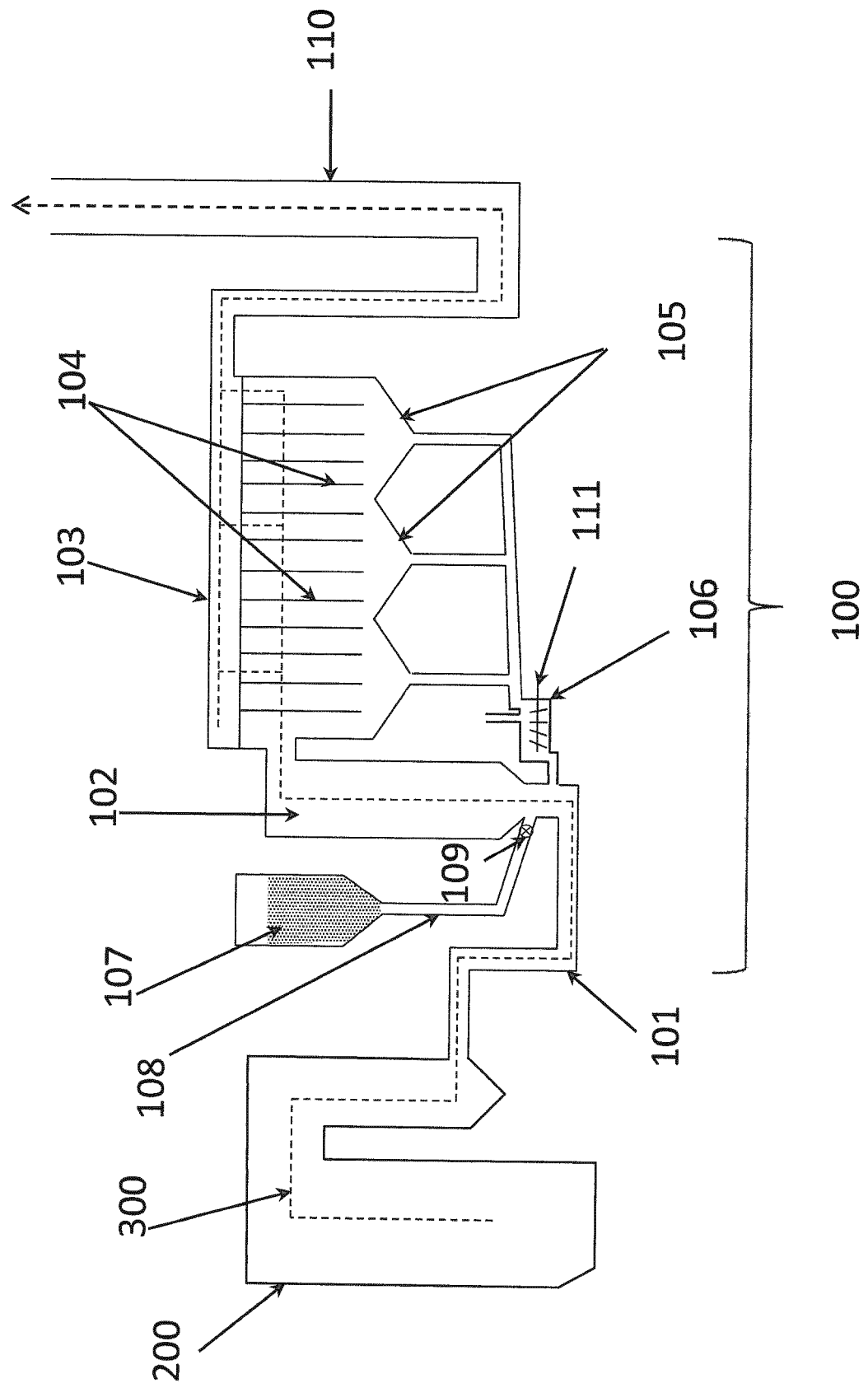
FIG. 1 shows a schematic embodiment of a circulating dry scrubber facility used in a process of flue gas treatment according to the present invention.

According to the invention, a lime-based sorbent suitable for use in a flue gas treatment process is provided. The lime base sorbent comprises:
- at least 70 wt. % of $Ca(OH)_2$, preferably at least 80 wt. % of $Ca(OH)_2$, more preferably at least 90 wt. % of $Ca(OH)_2$, more preferably at least 95 wt. % of $Ca(OH)_2$, with respect to the total weight of said lime-based sorbent under a dry form after drying until constant weight at 150° C. and;
- at least 0.2 wt. % to at most 10 wt. %, preferably at least 1 wt. % to at most 5 wt. %, more preferably at least 1.2 wt. % to at most 2.5 wt. %, with respect to the total weight of said lime-based sorbent under a dry form after drying until constant weight at 150° C., of a first additive selected among the group of hydrogels of natural or forming materials synthetic origin, in particular superabsorbent polymers (SAPs) or in the group of cellulose ethers or a combination thereof.

The $Ca(OH)_2$ present in said sorbent can be measured qualitatively and quantitatively by usual techniques known by the skilled in the art. The amount of calcium is measured by XRF, the cristalline structure of the compounds is analyzed by XRD and the determination of the proportion of calcium carbonate and/or calcium oxide if present, and calcium hydroxide is determined by thermogravimetry on a sample dried at 150° C. until constant weight.

The additive present in said sorbent can be measured qualitatively and quantitatively by NMR. The additive in said sorbent can be detected after preparation of a sample dried at 150° C. until constant weight and mixing in a deuterated solvent, or a mixture of deuterated solvents, preferably a mixture of $D_2O$ and $CD_3CN$, by $^1$H NMR or $^{13}$C NMR or a combination thereof using a probe HR-MAS (high resolution magic angle spinning) for analysis in semi-liquid state, or measured on a solid sample dried at 150° C. until constant weight by solid state $^1$H NMR or solid state $^{13}$C NMR. Quantitative measurements by NMR can be done by comparison with calibration curves obtained by preparation of samples of sorbent comprising the additive in various concentrations. The sample must be dried until constant weight before the analysis since the said first additive has the property to retain water, the lime-based sorbent may contain an amount of water for example coming from the ambient air or from the manufacturing process.

The said first additive is selected among:
- the group of hydrogels forming materials of synthetic origin including polyacrylates, polyacrylic acids, crosslinked polyacrylates and polyacrylic acids or crosslinked acrylamide and acrylate copolymers, in particular those partially neutralized with sodium and/or potassium, or
- the group of hydrogels forming materials of natural origin including guar gum, alginates, dextran or xanthane gum or a combination thereof and/or;
- the group of cellulose ethers, including hydroxyalkyl or carboxyalkyl cellulose ethers, in particular carboxymethyl cellulose or hydroxyethyl methyl cellulose (HEMC).

The said superabsorbent polymer is selected among crosslinked polymers of acrylic or methacrylic acid, crosslinked graft copolymers of the polysaccharide/acrylic or methacrylic acid, crosslinked terpolymers of acrylic acid or methacrylic acid/acrylamide/sulfonated acrylamide and their alkaline earth or alkaline metal salts.

In one embodiment, the lime-based sorbent according to the invention further comprises sodium wherein the amount of sodium expressed under its equivalent $Na_2O$ oxide form in said lime-based sorbent measured by XRF is of at least 0.1 weight % of sodium, preferably at least 0.3 weight %, preferably at least 0.5 weight %, preferably at least 0.7 weight %, preferably at most 15 weight %, preferably at most 7 weight %, preferably at most 5 weight %, preferably at most 2.5 weight % with respect to the total weight of said sorbent under a dry form.

Preferably, the lime-based sorbent has a BET specific surface area comprised of at least 3 $m^2/g$, preferably at least 10 $m^2/g$, more preferably at least 20 $m^2/g$, preferably at least 40 $m^2/g$ measured by manometry with adsorption of nitrogen after degassing in vacuum at 190° C. for at least 2 hours and calculated according the multipoint BET method as described in the ISO 9277/2010E standard.

Preferably, the lime-based sorbent a total BJH pore volume of at least 0.01 $cm^3/g$, preferably at least 0.05 $cm^3/g$, more preferably at least 0.1 $cm^3/g$, more preferably at least 0.2 $cm^3/g$ determined by manometry with adsorption of nitrogen after degassing in vacuum at 190° C. for at least 2 hours and calculated according the multipoint BJH method as described in the ISO 9277/2010E standard.

In one embodiment, the lime-based sorbent is a blend of:
- powdered particles of slaked lime having a particle size distribution comprised in a first range of values, and;
- powdered particles of said first additive having a particle size distribution comprised in a second range of values overlapping or being equal to the said first range.

The lime-based sorbent according to the invention is obtained by a process of manufacturing comprising the steps of:

slaking quicklime with water in a hydrator via a non-wet route;

collecting a slaked lime at an exit of the hydrator;

characterized in that said process comprises a further step of adding at least a first additive selected among the group of hydrogels forming materials of natural or synthetic origin, in particular superabsorbent polymers (SAPs) or in the group of cellulose ethers or a combination thereof, said first additive being added before, during or after said step of slaking, at a weight ratio relative to the weight of said slaked lime comprised between 0.2 and 10%, preferably at most 5 wt. %, more preferably at most 2.5 wt. %, wherein the amount of said slaked lime is expressed under equivalent CaO and the amount of said first additive is expressed under dry equivalent form after drying until constant weight at 150° C.

Preferably, the said first additive is selected among:

the group of hydrogels forming materials of synthetic origin includes polyacrylates, polyacrylic acids, cross-linked polyacrylates and polyacrylic acids or cross-linked acrylamide and acrylate copolymers, in particular those partially neutralized with sodium and/or potassium, the group of hydrogels forming materials of natural origin includes guar gum, alginates, dextran or xanthan gum or a combination thereof or the group of cellulose ethers, includes hydroxyalkyl or carboxyalkyl cellulose ethers, in particular carboxymethyl cellulose or hydroxyethyl methyl cellulose (HEMC).

In one embodiment of the manufacturing process, the said first additive is added before or during the said step of slaking and is provided at least partially or totally in solution or in suspension and added to the water used for the slaking step.

In another embodiment of the manufacturing process, the said first additive is added after the slaking step and is provided at least partially or totally in solution or in a suspension and added to the slaked lime, for example by spaying the additive to the collected slaked lime.

In another embodiment of the manufacturing process, the said first additive is added before the step of slaking, as a powder to the quicklime.

In another embodiment of the manufacturing process, the said first additive is added after the step of slaking on the collected slaked lime. Preferably the first additive added after the step of slaking is under the form of a powder.

In another embodiment of the manufacturing process of the lime-based sorbent according to the invention, the manufacturing process further comprises a step of addition of a second additive being a salt or hydroxide of an alkali metal before and/or during and/or after said step of slaking, the amount of a salt or hydroxide of an alkali metal being sufficient for obtaining in said slaked lime, a content of an alkali metal expressed in oxide equivalent of this alkali metal equal to or greater than 0.2% and equal to or less than 3.5% by weight on the basis of the total weight of the slaked lime.

Preferably, the said a salt or hydroxide of an alkali metal is hydrosoluble and can be selected amongst sodium hydroxide, sodium carbonate, sodium hydrogenocarbonate, sodium nitrate, sodium phosphate, sodium persulfate or sodium acetate. Preferably, the salt or hydroxide of an alkali metal has a solubility at 20° C. in water superior or equal to 50 g/dm³, preferably superior or equal to 100 g/dm³, preferably superior or equal to 200 g/dm³, preferably superior or equal to 300 g/dm³, preferably superior or equal to 500 g/dm³.

In one embodiment of the manufacturing process, the second additive is added before, during or after the step of slaking, and the first additive is added after the said step of slaking, preferably under the form of a powder. The second additive may be added under the form of a powder or in a solution.

In the process of manufacturing the lime-based sorbent according to the invention, the residence time of quicklime being slaked inside the hydrator is preferably comprised between 5 and 45 minutes, preferably between 20 and 40 minutes and more preferably between 25 and 35 minutes.

In an embodiment of the process of manufacturing the lime-based sorbent wherein the first additive is added before or during the said step of slaking, the process further comprises a step of drying said lime-based sorbent and/or granulometric cutting of said lime-based sorbent and/or grinding or milling said lime-based sorbent.

In another embodiment of the process of manufacturing of the lime-based sorbent wherein the said first additive is added to the slaked lime after the said step of slaking, the process further comprises:

a step of granulometric cutting of the collected slaked lime such that to remove a fraction of particles outside a first range of values, and;

a step of granulometric cutting of the said first additive under a powdered form such that to remove a fraction of particles outside a second range of values overlapping or being equal to the first range of values, in order to provide particles of hydrated lime and particles of first additive having similar particle size distribution, and;

blending the said slaked lime and the said first additive in a homogenizing device.

In another embodiment of the process of manufacturing according to the invention, the process comprises the steps of:

providing quicklime with a predetermined particle size distribution comprised in a third range of particle size defined by a $d_{max}$ and a $d_{min}$;

providing said first additive with a particle size distribution comprised between a fourth range of particle size defined by a $d_{max}$ and a $d_{min}$, overlapping or comprised in the range of the said third range of particle size and mixing the said first additive with the said quicklime having a particle size distribution comprised in a third range of particle size defined by a $d_{max}$ and a $d_{min}$ to form a premix;

slaking the said premix via a non-wet route in a hydrator to obtain slaked lime containing said first additive;

collecting slaked lime at an exit of the said hydrator optionally drying the said slaked lime;

optionally grinding the said slaked lime;

optionally sieving or air classifying said slaked lime.

For example, said first additive can be classified to have a particle size distribution with a $d_{min}$ superior or equal to 1 μm, and a $d_{max}$ inferior or equal to 200 μm and said powdered slaked lime is classified such that to have a particle size distribution with a $d_{min}$ superior or equal to 1 μm, and a $d_{max}$ 200 μm, alternatively with a $d_{min}$ superior or equal to 1 μm, and a $d_{max}$ inferior to 20 μm, alternatively with a $d_{min}$ superior or equal to 5 μm, and a $d_{max}$ inferior to 20 μm, alternatively with a $d_{min}$ superior or equal to 20 μm, and a $d_{max}$ inferior to 35 μm, alternatively with a $d_{min}$ superior or equal to 20 μm, and a $d_{max}$ inferior to 50 μm, alternatively with a $d_{min}$ superior or equal to 50 μm, and a $d_{max}$ inferior to 100 μm, alternatively with a $d_{min}$ superior or equal to 50 µm, and a $d_{max}$ inferior to 150 µm, alternatively with a $d_{min}$ superior or equal to 100 µm, and a $d_{max}$ inferior to 200 µm.

In an embodiment of the process of manufacturing according to the invention, the said first additive is added before the step of slaking to the quicklime such as to form a premix which is provided into the hydrator for the step of slaking. It can be advantageous in term of logistics and costs for plants having a flue gas treatment installation and a hydrator to provide a premix including quicklime and at least the said first additive.

The premix according to the invention comprises:
at least 70 wt. %, more preferably at least 85 wt. % of quicklime with respect to the total weight of said premix under a dry form after drying until constant weight at 150° C., and;
at least 0.2 wt. % to at most 10 wt. %, preferably at least 1 wt. % to at most 5 wt. %, more preferably at least 1.2 wt. % to at most 2.5 wt. %, of a first additive selected among the group of hydrogels forming materials of natural or synthetic origin, in particular superabsorbent polymers (SAPs) or in the group of cellulose ethers or a combination thereof, with respect to the total weight of said premix under a dry form after drying until constant weight at 150° C.

Preferably, in the premix, the said powdered quicklime and said powdered first additive are under the form of a blend of powders comprising:
powdered particles of quicklime having a particle size distribution comprised in a third range of values $d_{max}$ and $d_{min}$, and;
powdered particles of said first additive having a particle size distribution comprised in a fourth range of values $d_{max}$ and $d_{min}$ overlapping or being equal to the said third range.

In an embodiment of the premix, the quicklime is provided preferably after a step of grinding and optionally after a step of granulometric cutting, with a particle size distribution defined by a first set of values of $d_{min}$, and $d_{max}$, and the said first additive is selected, for example after a step of granulometric cutting of such as to have a particle size distribution defined by a second set of values of $d_{min}$, and $d_{max}$. Advantageously, the value $d_{50}$ of one of the quicklime or the said first additive is comprised between the values $d_{min}$ and $d_{max}$ of the other. Preferably both values of $d_{50}$ of the quicklime and of the first additive are comprised between the values $d_{min}$ and $d_{max}$ of each other. Similar particle size distribution of quicklime and said first additive advantageously prevents segregation of both compounds.

In another embodiment, the said premix can also contain the said second additive.

The lime-based sorbent according to the invention, obtained from a process as described herein is advantageously used in a flue gas treatment process including circulating dry scrubber process or dry sorbent injection process.

The present invention is also related to a flue gas treatment process wherein gas containing pollutants are circulated through a duct before reaching a particulate control device, characterized in that it comprises a step of injection of a lime-based sorbent as disclosed herein.

In one embodiment the flue gas treatment process is a circulating dry scrubber process. Circulating dry scrubber (CDS) units or facilities are well known in the art and are operated for removing pollutants from flue gases. CDS technology was first developed for $SO_2$ removal in coal-fired power plants. Today it is also used in flue gas treatment for industrial furnaces and boilers that use biomass, industrial or municipal waste as fuels. The CDS process is able to remove both acidic gas components and micro-pollutants. It is based on the recirculation of filter residue which consists of sorbent reaction products and fly ash from the filter. CDS units operate with calcium-based sorbents.

A non-limitative example of a CDS is represented in FIG. 1. The CDS facility 100 is arranged downstream of a gas burner 200 which is connected by a first duct 101 to the bottom of a reactor 102. A reservoir 107 containing fresh sorbent is connected by a second duct 108 to the bottom of the reactor 102 and a metering device 109 is arranged between the second duct and the bottom of the reactor for injecting fresh sorbent when required. The gas 300 containing pollutants flows from the burner 200 through the first duct 101, then through the reactor 102 wherein pollutants react with the fresh sorbent, then the gas and the partially reacted sorbent are filtered through a particulate filter device 103 arranged downstream of the reactor 102 and upstream of a stack 110. The particulate filter device 103 comprises a plurality of baghouse filters 104. The reacted sorbent, the unreacted sorbent and optionally fly ashes collected to the baghouse filters 104 form the residues. The residues collected are removed from the baghouse filters 104 and falls into hoppers 105 at the bottom of the particle filter device 103 while the flue gas depleted in pollutants is evacuated through the stack 110. The residues are directed to a conditioning mixer 106 comprising a mixer shaft 111 and wherein water is added to reactivate the residue before the being recycled into the reactor 102.

In a process of flue gas treatment using a circulating dry scrubber unit or facility according to the present invention, fresh lime-based sorbent as disclosed herein is introduced in the CDS facility. The sorbent according to the present invention is able to provide a residue which has a good flowability in the CDS process, thereby preventing sticking in pipes, ducts or other parts of the circulating dry scrubber unit or facility. The sorbent according to the invention is able to release its water at low temperature, typically at the temperature of the circulating dry scrubber unit or facility between 50° C. and 350° C. The lime-based sorbent according to the present invention provides a residue in a CDS process that presents good flowability properties, even with high moistures also called carried water such as more than 10 weight % in the residue circulating in a circulating dry scrubber unit with respect to the total weight of said sorbent under a dry form.

In one embodiment, the flue gas treatment process is a dry sorbent injection (DSI) process. Such a process is more simple than circulating dry scrubber process and comprises a step of dry injection of the lime-based sorbent as described herein into the flue gas before a filtering unit, usually a bag filter, or an electrostatic precipitator. The lime-based sorbent reacts with the pollutants in a single pass.

The reaction between the gas-phase pollutants and the sorbent occurs in the reactor or flue gas duct and continues in the filter, especially with a bag filter. The reaction products and fly ash from the process are captured by downstream filtering equipment.

One of the advantages of using the lime-based sorbent according to the invention in a dry sorbent injection process, is that the first additive can capture the moisture and thereby minimize sticking of the sorbent into the storage silo or into the injection pipe connected to the flow gas duct.

EXAMPLES

Description of the Pilot Plant

Experiments are conducted in a CDS pilot unit which comprises three main units connected together: a reactor, a filter means and a mixing zone. The reactor is a Venturi reactor and comprises a vertical thermally insulated tube (7 m long, 4 cm diameter).

The bottom of the reactor comprises an inlet for injecting a flow of synthetic gas containing acid gas ($N_2$, $O_2$, $H_2O$, $CO_2$, $SO_2$). The synthetic gas flows through the reactor and then through a fabric bag house filter arranged at the top of the reactor and which comprises 6 sleeves, each one having a surface of 0.1 $m^2$.

The temperature of the synthetic gas flow is measured at the baghouse filter and controlled at the bottom of the reactor by heating resistances to reach 100° C. at the baghouse filter.

The bottom of the reactor comprises an inlet for injection of fresh sorbent and an inlet for injection of recycled materials which are reacted fresh sorbent having circulated at least once through the reactor. The fresh sorbent is introduced in the bottom of the reactor through pneumatic conveying, whereas recirculated material is introduced in the bottom of the reactor via a dosing screw. The range of injection rates are respectively 0 to 300 g/h for the fresh sorbent and 0 to 6000 g/h for the recycled materials.

The solids particles of fresh sorbent and/or recycled materials are entrained by the gas flow through the reactor to the fabric filter. The fabric filter (filter means) separates the gas from the solid particles comprising at least partially reacted fresh sorbent and the recirculated material (the residue).

The solid residue is then stored and conveyed by means of three hoppers equipped with butterfly valves: a buffer hopper, an extraction hopper where a fixed amount of product is taken out to keep the mass balance in the system in case of injection of fresh sorbent, and a weighing hopper. The residue is then dosed in the conditioning mixer (mixing zone) thanks to a conveying screw.

In the conditioning mixer, a given quantity of water is thoroughly mixed with the recycled material. The water content added to the recycled material can vary from 0.1 weight % up to 30 weight % with respect to the total weight of the sorbent fed to the mixer. Water is injected in the mixer thanks to a stainless steel hollow cone nozzle.

The conditioning mixer comprises an elongated recipient comprising two shafts extending from a first extremity to a second extremity. The recipient of the conditioning mixer has a capacity of about 7 $dm^3$. A first inlet for introducing the residue in the recipient is arranged close to the first extremity of the recipient and a water injection nozzle is arranged downstream the first inlet and at the vicinity of said first inlet for introducing water in said recipient and for humidifying the said residue. An outlet for evacuating the humidified residue out of the recipient is arranged at the bottom of the recipient close to its second extremity. The two shafts are arranged in the recipient parallel to each other and are provided with oriented flat paddles with interpenetrating rotation (center flow upwards). The shafts fit into a cylinder of a first diameter D1 and the outermost extremities of the paddles fit into a cylinder of a second diameter D2. The central axes of both shafts are spaced from each other at a distance strictly longer than the first diameter D1 and inferior to the second diameter D2. The bottom of the recipient is profiled as a double rounded bottom matching with the cylinder of rotation formed by the paddles and such that the paddles never touch the double rounded bottom of the recipient. Each paddle of one of the shafts is offset from the paddles of the other shaft such that to allow rotation of the shafts. Each paddle of a same shaft is radially offset from an angle of 120° relative to the adjacent paddle. At the vicinity of the first extremity of the recipient, both shafts comprise two first paddles oriented at 20° relative to the longitudinal axis of the shaft, such as to convey the residue under the water injection nozzle. Both shaft further comprises five paddles arranged downstream the two first paddles and oriented with and angle of 50° relative to the longitudinal axis of the shafts in order to produce intensive backmixing and thus an accumulation of residue in the mixing zone. Both shafts further comprise four last paddles arranged downstream the said five paddles and oriented at an angle of 20° relative to the longitudinal axis of the shaft such as to push the humidified residue progressively out of the mixer. Such kinds of conditioning mixer are commonly used in CDS facilities.

After the mixer, the humidified residue falls into a longitudinal hopper equipped with a bridge breaker and a conveying screw to reintroduce the humidified residue in the reactor.

The behavior of the sorbent according to the present invention and the behavior of a comparative sorbent are tested in the CDS pilot unit.

A testing protocol is realized to evaluate the response in term of product stickiness and overall CDS process operability of the converted solid material (less than 10% free lime) circulating into the equipment to an increasingly high amount of water added on the recirculated material into the conditioning mixer.

In a first phase of the testing protocol, the initially unreacted fresh sorbent considered is put in presence of $SO_2$ and $CO_2$ to obtain a sorbent converted into a residue. The conversion of the sorbent into residue is considered achieved when the available lime $Ca(OH)_2$ measured in the residue is lower than 10 wt. %. In order to accelerate the conversion of the sorbent, the unreacted fresh sorbent is added at once at the beginning of the test and no further fresh sorbent is added at a later stage.

In a second phase of the testing protocol, the residue is recirculated in the CDS pilot unit while progressively increasing the amount of water added into the conditioning mixer until a problem in the CDS pilot unit occurs, e.g. pressure drop, clogging, pasty residue. The highest amount of water (in % w/w) achieved still leading to nominal operation is considered as the result of the test. It is wished to have a residue which can flow in the CDS pilot unit under relatively high values of moisture. A sorbent providing such a residue in the CDS pilot unit is therefore more efficient in term of $SO_2$ uptake and can be regenerated more times and recirculated for a longer time, resulting in a decrease of consumption of sorbent.

Comparative Example

In the comparative example, the fresh sorbent used is a sample of slaked lime which doesn't comprise any additive. This slaked lime is produced industrially in one of the applicant's hydration plants. In this plant, a three-stage hydrator (Pfeiffer) is fed with a 0-3 mm quicklime at 4 t/h and with water. The amount of water is adjusted in order to target a moisture content in the product coming out of the hydrator below 1%. This moisture content is measured by loss on drying at 150° C. The temperature inside the hydrator is also used as a process control parameter, especially the temperature measured in the second stage that should be ranging typically between 100 and 105° C. From the outlet of the hydrator, the product is brought to an air classifier via a conveying screw and a bucket elevator.

In this classifier, the product is cut into a coarse fraction (typically >65 μm) and a fine fraction (typically <65 μm), the latter going then directly to a storage silo. The slaked lime of the comparative example presents the following physical properties:
- a moisture content of 1 wt. % measured by loss on drying at 150° C.,
- a specific surface area BET of 14 m$^2$/g measured by manometry with adsorption of nitrogen after degassing in vacuum at 190° C. for at least 2 hours and calculated according to the multipoint BET method as described in the ISO 9277/2010E standard,
- a pore volume of 0.063 cm$^3$/g determined by manometry with adsorption of nitrogen after degassing in vacuum at 190° C. for at least 2 hours and calculated according the BJH method as described in the ISO 9277/2010E standard, and
- a d98 of less than 70 μm, measured by laser granulometry in methanol after 2 minutes of sonication at 100 W.

The slaked lime of the comparative example is tested in the CDS pilot unit according to the testing protocol described above. In the first phase of the testing protocol, an amount of 4.2 kg of the fresh sorbent is loaded in the CDS pilot unit. The fresh sorbent is directly injected at the bottom of the reactor by a reinjection screw. The flow rate of the synthetic gas is setup to 25 Nm$^3$/h, and its composition is a mixture of gas described in table 1.

TABLE 1

| Parameter | Setpoint |
|---|---|
| Gas | |
| Total flowrate | 25 Nm$^3$/h |
| HCl | 0 Ndm$^3$/h |
| SO$_2$ | 25 Ndm$^3$/h (1000 ppm - 0.1%) |
| N$_2$ | 100 Ndm$^3$/h |
| CO$_2$ | 250 Ndm$^3$/h (1%) |
| H$_2$O (steam) | 2000 Ndm$^3$/h - 8% (vol) |
| Gas balance | air |
| Temperature | 100° C. at the filter |
| Sorbent | |
| Fresh sorbent introduced at once | 4.2 kg |
| Fresh sorbent feed rate (continuous) | 0 g/h |
| Recirculation flowrate | 2.5 kg/h to 4 kg/h |
| Water added in mixer | 10% (w/w) |

The residue is separated from the gas by the baghouse filter which is automatically cleaned with air pulses when the differential pressure over the filter reaches 6 mbar. The residue is then collected, and falls through a cascade of hoppers to reach the conditioning mixer, wherein the residue is added at a flow of 2500 g/h to be mixed with 250 mL/h of water to obtain a moisturization of 10%. This humidified residue is then reintroduced at the bottom of the reactor and recirculated again. When the residue exhibits a good behavior in term of flowing, e.g. when 200 g of residue can be dosed in the reactor in less than 120 seconds, generally after 7 hours, the recirculation flow is set at 4000 g/h, to be mixed with 400 mL/h of water to keep a moisturization of 10%.

Twice a day, at periods of time spaced from at least 3 hours, a first sample of the residue is collected after the mixing zone and a second sample of the residue is collected in the weighing hopper (also equivalent to the reactor outlet) for analyzing the content in carbonate, sulfur species (sulfate or sulfite) and unreacted Ca(OH)$_2$ (available lime). The conversion of the sorbent into residue is considered achieved when the available lime Ca(OH)$_2$ measured in the residue is lower than 10 wt. %.

In the second phase of the protocol, the gas flow rate is maintained at 25 m$^3$/h and injection of SO$_2$ and CO$_2$ are stopped. The recirculation flowrate of the residue is maintained at 4 kg/h and the humidity in the mixer is increased from 12 by steps of 2% at periods of time of at least 3 hours until a problem of clogging or pressure drop occurs.

For each step of increasing the humidity, at least one sample is collected at the filter and out of the mixer for measuring the moisture content of each residue by loss of drying at 150° C.

The highest amount of water added in the mixer that the installation could properly handle for the sample of the comparative example was 18%. Beyond this limit, the installation suffered from numerous process issues (severe cloggings, high pressure drops) induced by the high stickiness of the residue.

Example 1

In this example, the slaked lime of the comparative example has been used as a raw material and blended with a superabsorbent polymer which is a reticulated sodium polyacrylate having a particle size distribution d$_{max}$ inferior to 400 μm commercialized under the name Apromud™P150XL and supplied by the company Aprotek (see for example FR 3 029 195). The superabsorbent polymer is used as received and contains already 5% of moisture (measured by loss on drying at 150° C.), which can come from the air captured during handling and storage (storage at temperatures between 0 and 35° C.). In order to produce 5 kg of blend, 10 batches containing each 487.5 g of the slaked lime described above and 12.5 g of Apromud™P150XL are individually mixed in a Turbula® shaker-mixer for 10 min. The 10 batches are then put altogether in a 20 L capacity planetary mixer (brand Hobart) where they are mixed to produce a single batch of 5 kg. This batch contains 2.5 wt % of Apromud™ P150XL. Another sample is prepared in the same manner with adapted amounts to obtain a batch containing 10% of Apromud™P150XL.

The blend containing 2.5% of Apromud™P150XL is analyzed before being tested in the CDS pilot unit, and its main properties are shown here below:
- a moisture content of 1.1 wt. % measured by loss on drying at 150° C.,
- a specific surface area BET of 14.2 m$^2$/g measured by manometry with adsorption of nitrogen after degassing in vacuum at 190° C. for at least 2 hours and calculated according the multipoint BET method as described in the ISO 9277/2010E standard,
- a pore volume of 0.065 cm$^3$/g determined by manometry with adsorption of nitrogen after degassing in vacuum at 190° C. for at least 2 hours and calculated according the BJH method as described in the ISO 9277/2010E standard, and
- a d98 of less than 80 μm, measured by laser granulometry in methanol after 2 minutes of sonication at 100 W.

Figure 2:
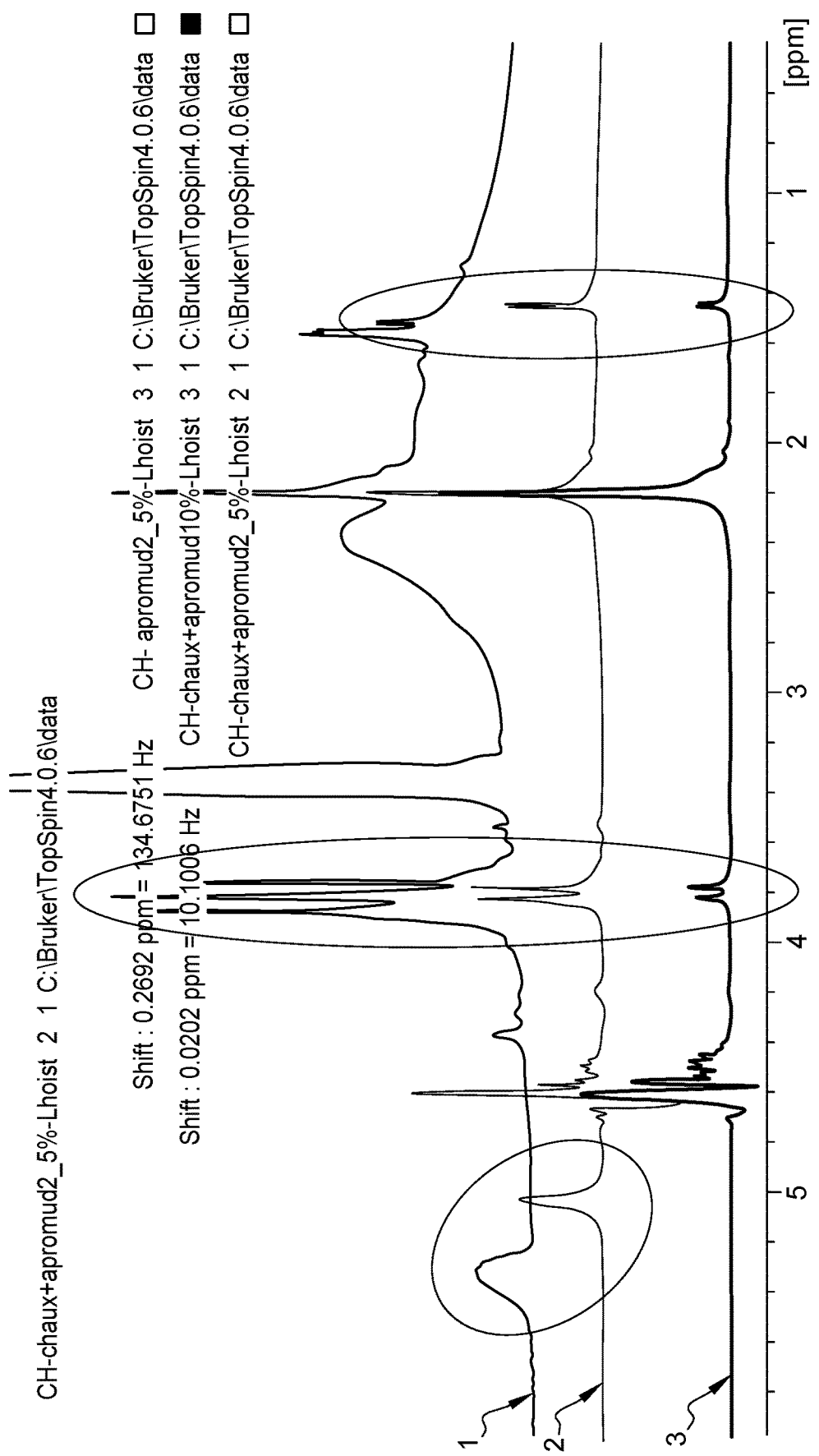
FIG. 2 shows $^1$H NMR spectrums obtained with a probe HR-MAS in semi-solid state of a sample of sodium polyacrylate commercialized under the name of Apromud™P150XL by the company Aprotek, in a mixture of $D_2O$ and $CD_3CN$, and compared with a sample of a sorbent according to the present invention comprising 2.5% of Apromud™P150XL in weight of the sorbent and with a sample of sorbent according to the invention comprising 10% of Apromud™P150XL in weight of the sorbent, measured in the same conditions.

The blends containing 2.5% and 10% of Apromud™P150XL are further characterized by $^1$H NMR. The additive partially solubilize in a mixture of water and acetonitrile making a trouble solution. 15 mg of powdery Apromud™P150XL are mixed in a vial with 15 μl of D$_2$O and 35 μl of CD$_3$CN and agitated vigorously for a few seconds to obtain a trouble solution which is analyzed by $^1$H NMR with a probe HR-MAS (high resolution magic angle spinning) dedicated for semi-solid mixtures. $^1$H NMR spectra is registered with 64 scans at ambient temperature, with a presaturation of the water peak and a rotation of 5000 Hz. Most of the signals are large because of the jellifying behavior of Apromud™P150XL in presence of water. The spectrum of Apromud™P150XL is presented in FIG. 2 with the reference number 1.

15 μg of the powdery blend containing 10% of Apromud™P150XL is mixed in a vial with 20 μl of $CD_3CN$ and 40 μl of $D_2O$, forming a slurry which is analyzed by $^1$H NMR with a probe HR-MAS (high resolution magic angle spinning) dedicated for semi-solid mixtures. $^1$H NMR spectra is registered with 64 scans at ambient temperature, with a presaturation of the water peak and a rotation of 5000 Hz. The spectrum of the blend containing 10% of Apromud™P150XL is presented in FIG. 2 with the reference number 2.

15 μl of the powdery blend containing 2.5% of Apromud™P150XL is mixed with 20 μl of $CD_3CN$ and 40 μl of $D_2O$, forming a slurry which is analyzed by $^1$H NMR with a probe HR-MAS (high resolution magic angle spinning) dedicated for semi-solid mixtures. $^1$H NMR spectra is registered with 64 scans at ambient temperature, with a presaturation of the water peak and a rotation of 5000 Hz. The spectrum of the blend containing 2.5% of Apromud™P150XL is presented in FIG. 2 with the reference number 3.

The spectrums of both blends are similar with more intense signals for the blend containing 10% of Apromud™P150XL and also with a supplementary signal around 5 ppm for the Apromud™P150XL alone and for the most concentrated sample. Comparison of the blends spectrums with the Apromud™P150XL alone shows the presence of similar signals which are surrounded in FIG. 2, even if some chemical shifts and some additional larger signals are present on the spectra of Apromud™P150XL alone. Those shifts and additional signals can be explained by different behaviour of Apromud™P150XL in water wherein Apromud™P150XL might be completely jellified by water absorption whereas in presence of lime, a milky solution is obtained. Therefore, it is possible to detect the Apromud™P150XL additive in sample of sorbent according to the invention for a concentration relatively low of Apromud™P150XL additive such as 2.5% in weight of sorbent by $^1$H NMR using a probe HR-MAS.

The blend of slaked lime—reticulated sodium polyacrylate as obtained above is tested in the CDS pilot unit according to the testing protocol described above. In a first phase of the testing protocol, an amount of 4.2 kg of the fresh sorbent (i.e. the blend of slaked lime—reticulated sodium polyacrylate) is loaded in the CDS pilot unit. The fresh sorbent is directly injected at the bottom of the reactor by a reinjection screw. The synthetic gas flow rate setup in the process is 25 Nm$^3$/h, and its composition is the same as presented for the comparative example in table 1.

The residue is separated in a baghouse filter which is automatically cleaned with air pulses when the differential pressure over the filter reaches 6 mbar. The residue is then collected, and falls through a cascade of hoppers to reach the conditioning mixer wherein the residue is introduced at a flow of 2500 g/h to be mixed with 250 mL/h of water to obtain a moisturization of 10%. This humidified residue is then reintroduced at the bottom of the reactor and recirculated again. When the residue exhibits a good behavior in term of flowing, e.g. when 200 g of residue can be dosed in the reactor in less than 120 seconds, generally after 7 hours, the recirculation flow is set at 4000 g/h, to be mixed with 400 mL/h of water to keep a moisturization of 10%.

Twice a day, at periods of time spaced from at least 3 hours, a first sample of the residue is collected after the mixing zone and a second sample of the residue is collected in the weighing hopper (also equivalent to the reactor outlet) for analyzing the content in carbonate, sulfur species (sulfate or sulfite) and unreacted $Ca(OH)_2$ (available lime). The conversion of the sorbent into residue is considered achieved when the available lime $Ca(OH)_2$ measured in the residue is lower than 10 wt. %.

In the second phase of the protocol, the gas flow rate is maintained at 25 m$^3$/h and injection of $SO_2$ and $CO_2$ are stopped. The recirculation flowrate of the residue is maintained at 4 kg/h and the humidity in the mixer is increased from 12 by steps of 2% at periods of time of at least 3 hours until a problem of clogging or pressure drop occurs.

For each step of increasing the humidity, at least one sample is collected at the filter and out of the mixer for measuring the moisture content of each residue by loss of drying at 150° C.

The highest amount of water added in the mixer that the installation could properly handle for the sample of the example was 28%. Beyond this limit, the residue becomes too pasty and the process cannot be run anymore.

The blend slaked lime—reticulated sodium polyacrylate according to the invention is therefore able to run longer in the CDS pilot unit with higher moisture content compared to a slaked lime having similar physical properties but without additive.

The invention claimed is:

1. A lime-based sorbent in powder form suitable for a circulating dry scrubber process and for numerous passing cycles through a CDS facility comprising:
    at least 70 wt. % of $Ca(OH)_2$ with respect to the total weight of said lime-based sorbent under a dry form after drying until constant weight at 150° C.,
    at least 0.2 wt. % to at most 10 wt. % with respect to the total weight of said lime-based sorbent under a dry form after drying until constant weight at 150° C., of a first additive selected from the group consisting of hydrogels forming materials of natural or synthetic origin, superabsorbent polymers (SAPS) or cellulose ethers or a combination thereof,
    having a BET specific surface area comprised of at least 3 m$^2$/g, measured by manometry with adsorption of nitrogen after degassing in vacuum at 190° C. for at least 2 hours and calculated according to the multipoint BET method as described in the ISO 9277/2010E standard, and
    having a total BJH pore volume of at least 0.01 cm$^3$/g, determined by manometry with adsorption of nitrogen after degassing in vacuum at 190° C. for at least 2 hours and calculated according to the multipoint BJH method as described in the ISO 9277/2010E standard.

2. The lime-based sorbent according to claim 1, wherein said first additive is selected from the group consisting of:
    the group of hydrogels forming materials of synthetic origin including polyacrylates, polyacrylic acids, cross-linked polyacrylates and polyacrylic acids, or cross-linked acrylamide and acrylate copolymers partially neutralized with sodium and/or potassium, or
    the group of hydrogels forming materials of natural origin including guar gum, alginates, dextran or xanthane gum or a combination thereof and/or;

the group of cellulose ethers, including hydroxyalkyl or carboxyalkyl cellulose ethers, carboxymethyl cellulose or hydroxyethyl methyl cellulose (HEMC).

3. The lime-based sorbent according to claim 1, wherein said superabsorbent polymer is selected from the group consisting of crosslinked polymers of acrylic or methacrylic acid, crosslinked graft copolymers of the polysaccharide/acrylic or methacrylic acid, crosslinked terpolymers of acrylic acid or methacrylic acid/acrylamide/sulfonated acrylamide and their alkaline earth or alkaline metal salts.

4. The lime-based sorbent according to claim 1, further comprising sodium wherein the amount of sodium expressed under its equivalent $Na_2O$ oxide form in said lime-based sorbent measured by XRF is of at least 0.1 weight % of sodium with respect to the total weight of said lime-based sorbent under a dry form.

5. A method of use in a flue gas treatment process, comprising contacting the flue gas with the lime-based sorbent according to claim 1 in a circulating dry scrubber process or dry sorbent injection process.

6. A flue gas treatment process wherein gas containing pollutants are circulated through a duct before reaching a particulate control device, comprising a step of injection of the lime-based sorbent according to claim 1.

7. A process of manufacturing the lime-based sorbent according to claim 1, the process comprising:
    slaking quicklime with water in a hydrator via a non-wet route,
    collecting a slaked lime at an exit of the hydrator, and
    adding at least a first additive selected from the group consisting of hydrogels forming materials of natural or synthetic origin, superabsorbent polymers (SAPs) or cellulose ethers or a combination thereof;
    wherein said first additive is added before, during or after said slaking, at a weight ratio relative to the weight of said slaked lime comprised between 0.2 and 10%, and wherein the amount of said slaked lime is expressed under equivalent CaO and the amount of said first additive is expressed under dry equivalent form after drying until constant weight at 150° C.

8. The process of manufacturing according to claim 7, wherein the said first additive is selected from the group consisting of:
    the group of hydrogels forming materials of synthetic origin including crosslinked polyacrylates or crosslinked acrylamide and acrylate copolymers partially neutralized with sodium and/or potassium,
    the group of hydrogels forming materials of natural origin including guar gum, alginates, dextran or xanthan gum or a combination thereof or
    the group of cellulose ethers, including hydroxyalkyl or carboxyalkyl cellulose ethers carboxymethyl cellulose or hydroxyethyl methyl cellulose (HEMC).

9. The process of manufacturing according to claim 7, wherein
    said first additive is provided at least partially in a solution or in a suspension and added to said water and/or to said slaked lime, and/or;
    said first additive is provided at least partially under solid form and added to said quicklime and/or to said slaked lime.

10. The process of manufacturing according to claim 7, further comprising a step of addition of a second additive, wherein said second additive is a salt or hydroxide of an alkali metal, before and/or during and/or after said slaking, wherein a content of said alkali metal is equal to or greater than 0.2% and equal to or less than 3.5% by weight with respect to the total weight of said slaked lime.

11. The process of manufacturing according to claim 7, wherein a residence time of quicklime slaked inside the hydrator is between 5 and 45 minutes.

12. The process of manufacturing according to claim 7, wherein said first additive is added before or during said slaking further comprising a step of drying said lime-based sorbent and/or a step of granulometric cutting of said lime-based sorbent and/or grinding or milling said lime-based sorbent.

13. The process of manufacturing according to claim 7, wherein said first additive is added to said slaked lime after said slaking, the process further comprising:
    a step granulometric cutting of said slaked lime;
    a step of granulometric cutting of said first additive under a powdered form, and
    a step of blending said slaked lime and said first additive in a homogenizing device.

\* \* \* \* \*